(12) United States Patent
Ohmori

(10) Patent No.: US 9,025,312 B2
(45) Date of Patent: *May 5, 2015

(54) ELECTRIC DOUBLE LAYER CAPACITOR

(75) Inventor: Masahiro Ohmori, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 482 days.

This patent is subject to a terminal disclaimer.

(21) Appl. No.: 13/302,373

(22) Filed: Nov. 22, 2011

(65) Prior Publication Data

US 2012/0063060 A1 Mar. 15, 2012

Related U.S. Application Data

(63) Continuation of application No. 12/567,418, filed on Sep. 25, 2009, now Pat. No. 8,085,526, which is a continuation of application No. 11/545,495, filed on Oct. 11, 2006, now Pat. No. 7,646,587.

(60) Provisional application No. 60/727,548, filed on Oct. 18, 2005.

(30) Foreign Application Priority Data

Oct. 11, 2005 (JP) .................................. 2005-296444
Aug. 8, 2006 (JP) .................................. 2006-216299

(51) Int. Cl.
*H01G 9/00* (2006.01)
*H01G 11/24* (2013.01)
(Continued)

(52) U.S. Cl.
CPC ............... *H01G 11/24* (2013.01); *H01G 11/28* (2013.01); *H01G 11/42* (2013.01); *H01G 11/70* (2013.01); *H01G 11/86* (2013.01); *Y02E 60/13* (2013.01)

(58) Field of Classification Search
USPC ......... 361/502, 503, 504, 509–512, 517, 519, 361/523–525
See application file for complete search history.

(56) References Cited

U.S. PATENT DOCUMENTS 5,557,497 A * 9/1996 Ivanov et al. ................. 361/502
5,682,288 A 10/1997 Wani
(Continued)

FOREIGN PATENT DOCUMENTS

EP  0 712 143 A2  5/1996
JP  S63-181307 A  7/1988
(Continued)

OTHER PUBLICATIONS

U.S. Appl. No. 14/154,545, filed Jan. 14, 2014, Ohmori.
(Continued)

*Primary Examiner* — Nguyen T Ha
(74) *Attorney, Agent, or Firm* — Oblon, McClelland, Maier & Neustadt, L.L.P.

(57) ABSTRACT

A collector for an electric double layer capacitor including a conductive sheet, and a film adhered on surface of the conductive sheet and including carbon fine particle and polysaccharide and/or cross-linked polysaccharide. An electrode for an electric double layer capacitor including a collector having a conductive sheet and a film adhered on surface of the conductive sheet, and a film including activated carbon and adhered on surface of the film of the collector. The film of the collector includes carbon fine particle and polysaccharide and/or cross-linked polysaccharide. An electric double layer capacitor including an electrode, a separator, and an electrolyte. The electrode includes a collector having a conductive sheet and a film adhered on surface of the conductive sheet, and a film including activated carbon and adhered on surface of the film of the collector. The film of the collector includes carbon fine particle and polysaccharide and/or cross-linked polysaccharide.

20 Claims, 2 Drawing Sheets

(51) Int. Cl.
    *H01G 11/28*     (2013.01)
    *H01G 11/42*     (2013.01)
    *H01G 11/70*     (2013.01)
    *H01G 11/86*     (2013.01)

(56) References Cited

U.S. PATENT DOCUMENTS

| | | |
|---|---|---|
| 6,327,136 B1 | 12/2001 | Meguro et al. |
| 6,574,092 B2 | 6/2003 | Sato et al. |
| 6,804,108 B2 | 10/2004 | Nanjundiah et al. |
| 7,646,587 B2 * | 1/2010 | Ohmori .................. 361/502 |
| 2001/0044045 A1 | 11/2001 | Sato et al. |
| 2002/0126439 A1 | 9/2002 | Sato et al. |
| 2005/0042450 A1 | 2/2005 | Sano et al. |
| 2009/0029255 A1 | 1/2009 | Ohmori |

FOREIGN PATENT DOCUMENTS

| | | |
|---|---|---|
| JP | S63-256119 A | 10/1988 |
| JP | 7-94374 | 4/1995 |
| JP | 9-183604 | 7/1997 |
| JP | 2000-169126 | 6/2000 |
| JP | 2002-270470 | 9/2002 |
| JP | 2003-309045 | 10/2003 |
| JP | 2004-31468 | 1/2004 |
| JP | 2005-136401 | 5/2005 |

OTHER PUBLICATIONS

European Search Report issued Mar. 6, 2013, in Patent Application No. EP 06 81 1507.

* cited by examiner

ELECTRIC DOUBLE LAYER CAPACITOR

CROSS REFERENCE TO RELATED APPLICATION

This application is a continuation of and claims the benefit of priority to U.S. application Ser. No. 12/567,418, filed Sep. 25, 2009, which is a continuation of U.S. application Ser. No. 11/545,495, filed Oct. 11, 2006, which is based on and claims the benefit pursuant to 35 U.S.C. §119(e)(1) of Provisional Application No. 60/727,548, filed Oct. 18, 2005, the entire contents of each of which are incorporated herein by reference. U.S. application Ser. No. 11/545,495 is based on and claims the benefit of priority to Japanese Patent Application No. 2005-296444, filed on Oct. 11, 2005, and Japanese Patent Application No. 2006-216299, filed on Aug. 8, 2006.

BACKGROUND OF THE INVENTION

1. Technical Field

The invention relates to a collector for an electric double layer capacitor, an electrode for an electric double layer capacitor, and an electric double layer capacitor, and a method of manufacturing the same.

2. Background Art

An electric double layer capacitor is quickly chargable and dischargable, tough against over-charge&discharge, long in life for cause of no chemical reaction, workable under wide range of temperature, and easy on the environment for cause of heavy metal free, and has other property which battery does not have. An electric double layer capacitor is mainly employed for a memory backup power supply and so on. An electric double layer capacitor is researched in application to electric power storing system or engine assist for hybrid car by assembling with battery such as solar battery and fuel cell.

An electric double layer capacitor comprises a pair of polarizable electrodes comprising a laminate of a collector such as an aluminum foil and a composition containing an activated carbon, in which the pair of polarizable electrodes set facing each other in solution containing electrolytic ion, and a separator is interposed between the polarizable electrodes. Impressing of direct current voltage into the electrodes causes drawing anion in solution to cathode (positive electrode) and drawing cation in solution to anode (negative electrode), making an electric double layer at the interface between electrode and solution. And the electric double layer can supply electric energy.

An internal resistance of an electric double layer capacitor needs to be as low as possible in order to obtain an electric double layer capacitor having high output and high capacity. It is known that an internal resistance of a capacitor is caused from an electrolytic solution, a polarizable electrode, a collector, and interface between them. So attempt to lower an internal resistance of the capacitor by lowering a volume resistance of the collector or the electrode has been carried out.

Patent document 1 discloses an electrode for an electric double layer capacitor comprising a laminate of an aluminum foil having a thickness of 10 to 50 μm, a conductive layer having a thickness of 0.2 to 20 μm and an electrode layer having a thickness of 80 to 500 μm in turn. The conductive layer is made from a conductive coating material comprising a graphite powder as a conductive material and polyamide-imide resin as a binder.

[Patent Document 1] JP-2002-270470-A

Patent document 2 discloses an electrode for an electric double layer capacitor comprising a laminate of an electrode layer containing a carbon material having a specific surface area of 100 to 2500 $m^2/g$ and a high conductive layer which is porous and has an electric conductivity higher than that of the above electrode layer in turn, in which the electrode layer is on a collector for an electrode. There is described that the electrode layer containing a carbon material having a specific surface area of 100 to 2500 $m^2/g$ is pasted on the collector for an electrode by using a conductive adhesive containing carbon.

[Patent Document 2] JP-2003-309045-A

Patent document 3 discloses a collector for an electric double layer capacitor comprising: a film comprising a conductive material and thermoplastic resin, and a tow electric resistance layer being on the film.

[Patent Document 3] JP-2004-31468-A

DISCLOSURE OF THE INVENTION

Subject to be Solved by the Invention

Conventional electric double layer capacitor including those in the above patent documents, however, is relatively large in an internal impedance, and is unsatisfactory for a quick charge-discharge.

In view of the matter, the invention is aimed at producing a collector for an electric double layer capacitor, an electrode for an electric double layer capacitor, and a method of manufacturing the same, for an electric double layer capacitor having low impedance and high capacity, and being quickly chargable and dischargable by high electric current.

Means for Solving the Subject

After the inventor did every research to achieve the goal, it was found out that use of an ion-permeable compound instead of conventional compound for binder, specifically forming of a film having both of ion-permeability and electric conductivity, more specifically forming of a film a comprising ion-permeable compound and carbon fine particle a on a conventional collector (Aluminum foil etc.) for an electric double layer capacitor can result in obtaining an electric double layer capacitor having low impedance and high capacity, and being quickly chargable and dischargable. The invention was made by further researching on the found out knowledge.

The invention provides the following means for solving.

(1) A collector for an electric double layer capacitor comprising:
a conductive sheet, and
a film a comprising an ion-permeable compound and a carbon fine particle a, in which the film a is on the conductive sheet.

(2) The collector for an electric double layer capacitor according to (1), in which the conductive sheet is aluminum foil, etching-foil of aluminum or punching-foil of aluminum.

(3) The collector for an electric double layer capacitor according to (1) or (2), in which the ion-permeable compound is a compound not being swellable with an organic solvent.

(4) The collector for an electric double layer capacitor according to any one of (1) to (3), in which the ion-permeable compound is a compound which does not come off in a friction peeling test with organic solvent.

(5) The collector for an electric double layer capacitor according to any one of (1) to (4), in which the ion-permeable compound is $1 \times 10^{-2}$ S/cm or more in a permeability of fluoride ion.

(6) The collector for an electric double layer capacitor according to any one of (1) to (5), in which the ion-permeable compound is 50,000 or less in an average molecular weight.

(7) The collector for an electric double layer capacitor according to any one of (1) to (6), in which the ion-permeable compound is polysaccharides or cross-linked polysaccharides.

(8) The collector for an electric double layer capacitor according to any one of (1) to (6), in which the ion-permeable compound is polysaccharides cross-linked by any of acrylamide, acrylonitrile, chitosan pyirolidone carboxylate, hydroxypropyl-chitosan, phthalic anhydride, maleic anhydride, trimellitic anhydride, pyromellitic anhydride, and acid anhydride.

(9) The collector for an electric double layer capacitor according to (7) or (8), in which the polysaccharides is chitosan or chitin.

(10) The collector for an electric double layer capacitor according to any one of (1) to (9), in which the film a does not come off in a tape peeling test (JIS D0202-1988).

(11) The collector for an electric double layer capacitor according to any one of (1) to (10), in which the film a is obtained by heat-curing.

(12) The collector for an electric double layer capacitor according to any one of (1) to (11), in which the film a further comprises activated carbon a.

(13) The collector for an electric double layer capacitor according to any one of (1) to (12), in which the carbon fine particle a is acicular or cylindric shape.

(14) An electrode for an electric double layer capacitor comprising:
a collector for an electric double layer capacitor according to any one of (1) to (13), and
a film b comprising a binder, a carbon fine particle b, and an activated carbon b, in which the film b is on the film a in the collector.

(15) The electrode for an electric double layer capacitor according to (14), in which the carbon fine particle b is acicular or cylindric shape.

(16) The electrode for an electric double layer capacitor according to (14) or (15), in which the activated carbon b is 800 to 2500 $m^2/g$ in a BET specific surface area.

(17) The electrode for an electric double layer capacitor according to any one of (19) to (16), in which the binder comprises an ion-permeable compound.

(18) A method of producing a collector for an electric double layer capacitor comprising steps of:
coating a solution or dispersion of an ion-permeable compound, a carbon fine particle a and a solvent on to a conductive sheet, and
drying the coat to form a film a.

(19) The method of producing a collector for an electric double layer capacitor according to (18), in which the ion-permeable compound is $1 \times 10^{-2}$ S/cm or more in a permeability of fluoride ion.

(20) The method of producing a collector for an electric double layer capacitor according to (18) or (19), in which the ion-permeable compound is 50,000 or less in an average molecular weight.

(21) The method of producing a collector for an electric double layer capacitor according to any one of (18) to (20), in which the ion-permeable compound is polysaccharides or cross-linked polysaccharides.

(22) The method of producing a collector for an electric double layer capacitor according to any one of (18) to (20), in which the ion-permeable compound is polysaccharides cross-linked by any of acrylamide, acrylonitrile, chitosan pyrrolidone carboxylate, hydroxypropylchitosan, phthalic anhydride, maleic anhydride, trimellitic anhydride, pyromellitic anhydride, and acid anhydride.

(23) The method of producing a collector for an electric double layer capacitor according to any one of (18) to (22), in which the carbon fine particle a is acicular or cylindric shape.

(24) The method of producing an electrode for an electric double layer capacitor comprising steps of:
coating a solution or dispersion of a binder, a carbon fine particle b, an activated carbon b, and a solvent on to the film a in the collector for an electric double layer capacitor according to any one of (1) to (13), and
drying the coat to form a film b.

(25) The method of producing an electrode for an electric double layer capacitor comprising steps of:
coating a solution or dispersion of an ion-permeable compound, a carbon fine particle a and a solvent on to a conductive sheet,
drying the coat to form a film a
coating a solution or dispersion of a binder, a carbon fine particle b, an activated carbon b, and a solvent on to the film a, and
drying the coat to form a film b.

(26) The method of producing an electrode for an electric double layer capacitor according to (25), in which the ion-permeable compound is $1 \times 10^{-2}$ S/cm or more in a permeability of fluoride ion.

(27) The method of producing an electrode for an electric double layer capacitor according to (25) or (26), in which the ion-permeable compound is 50,000 or less in an average molecular weight.

(28) The method of producing an electrode for an electric double layer capacitor according to any one of (25) to (27), in which the ion-permeable compound is polysaccharides or cross-linked polysaccharides.

(29) The method of producing an electrode for an electric double layer capacitor according to any one of (25) to (28), in which the ion-permeable compound, is polysaccharides cross-linked by any of acrylamide, acrylonitrile, chitosah pyrrolidone carboxylate, hydroxypropylchitosan, phthalic anhydride, maleic anhydride, trimellitic anhydride, pyromellitic anhydride, and acid anhydride.

(30) The method of producing an electrode for an electric double layer capacitor according to any one of (25) to (29), in which the carbon fine particle a is acicular or cylindric shape.

(31) The method of producing an electrode ror an electric double layer capacitor according to any one of (24) to (30), in which the carbon fine particle b is acicular or cylindric shape.

(32) The method of producing are electrode for an electric double layer capacitor according to any one of (24) to (31), in which the activated carbon b is 800 to 2500 $m^2/g$ in a BET specific surface area.

(33) An electric double layer capacitor comprising:
electrode for an electric double layer capacitor according to any one of (14) to (17), separator, and an electrolytic solution.

(34) The electric double layer capacitor according to (33) which is laminate type capacitor or reel type capacitor.

(35) A method or producing an electric double layer capacitor comprising steps of:
piling the electrode for an electric double layer capacitor according to any one of (14) to (17) and separator, and
immersing the pile of the electrode and the separator in an electrolytic solution.

(36) A power supply system comprising the electric double layer capacitor according to (33) or (34).

(37) A vehicle in which the electric double layer capacitor according to (33) or (34) is employed.

(38) A railroad in which the electric double layer capacitor according to (33) or (34) is employed.

(39) A ship in which the electric double layer capacitor according to (33) or (34) is employed.

(40) An aircraft in which the electric double layer capacitor according to (33) or (34) is employed.

(41) A portable apparatus in which the electric double layer capacitor according to (33) or (34) is employed.

(42) An apparatus for office work in which the electric double layer capacitor according to (33) or (34) is employed.

(43) A solar power generation system in which the electric double layer capacitor according to (33) or (34) is employed.

(44) A wind power generation system in which the electric double layer capacitor according to (33) or (34) is employed.

(45) A communication apparatus in which the electric double layer capacitor according to (33) or (34) is employed.

(46) An electronic tag in which the electric double layer capacitor according to (33) or (34) is employed.

In the description, "x 以上" and "y 以下" in Japanese include a boundary value x and y respectively, "x 未満" and "y 超" in Japanese don't include a boundary value x and y respectively. A range of "x~y" in Japanese includes boundary value x and y.

Effects of the Invention

In the invention, a collector for an electric double layer capacitor, an electric double layer capacitor employing an electrode for an electric double layer capacitor which an electrode layer (film b) is applied to the collector can have low impedance and high capacity, and is quickly chargable and dischargable by high electric current.

The collector for an electric double layer capacitor, the electrode for an electric double layer capacitor and the electric double layer capacitor can be easily obtained by the method of producing in the invention.

EXPLANATION OF SYMBOL

Figure 1:
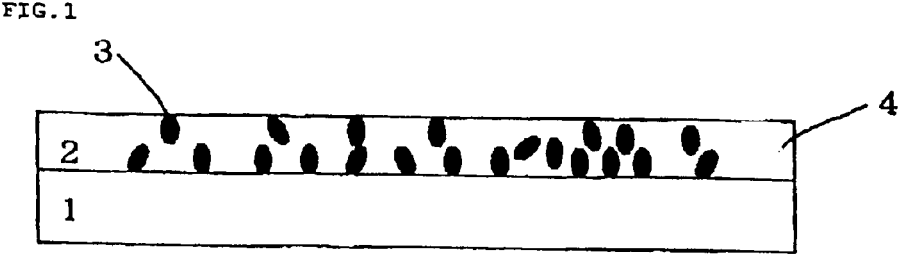
FIG. 1 schematic illustration of sectional formation of the collector for an electric double layer capacitor obtained in Example 1.

1: Aluminum foil
2: film a
3: carbon fine particle
4: ion-permeable compound
5: activated carbon b
6: film b (polarizable electrode layer)
7: binder

BEST MODE FOR CARRYING OUT THE INVENTION

A collector for an electric double layer capacitor of a preferable mode in the invention comprises a conductive sheet and film a comprising an ion-permeable compound and carbon fine particle a in which the film a is on the sheet.

The conductive sheet comprised in the collector for an electric double layer capacitor of a preferable mode in the invention includes not only a foil having no hole, but also a foil having hole such as a punching-metal foil and a lattice foil. The conductive sheet is not particularly limited as long as it is made of conductive material, a conductive metal sheet and a conductive resin sheet are mentioned. An aluminum sheet and aluminum alloy sheet may be specifically preferably mentioned. Used as aluminum foil is usually a foil such as A1085, A3003 in JIS (Japanese Industrial Standards).

Though the conductive sheet may be smooth, the favorable sheet is a sheet (etching foil) roughened by an electrical etching, a chemical etching or so on.

The conductive sheet is not particularly limited, usually 5 μm to 100 μm in a thickness. Thickness is so thin that mechanical strength is insufficient and it is easy to tear the conductive sheet. Thickness is so thick that the conductive sheet largely wastes the volume in the electric double layer capacitor, and an electric capacity per volume of the capacitor is apt to be lowered.

A film a comprised in the collector of a preferable mode in the invention comprises a carbon fine particle a and an ion-permeable compound.

The carbon fine particle a used in the invention is conductive fine particle containing carbon as main constituent. Acetylene black, ketjen black, vapor grown carbon fiber, graphite (black lead) and so on are favorable for the carbon fine particle a.

The carbon fine particle a is preferably $1 \times 10^{-1}$ Ω·cm or less in a electric resistance of a powder compact of 100%. The carbon fine particle a may be used alone or in combination with at least two.

The carbon fine particle a is not particularly limited by a particle size, is preferably 10 nm to 50 μM, more preferably 10 nm to 100 nm in a volume average particle size.

The carbon fine particle a may be spherical shape, preferably acicular or cylindric shape (anisotropic shape). Anisotropic carbon fine particle a is large in a surface area per weight, which allows to increase a contact area with a conductive sheet, the following activated carbon b and so on, so electric conductivity between an aluminum foil and the activated carbon b can be enlarged by even a little carbon fine particle a. Mentioned as anisotropic carbon fine particle a is a carbon nano-tube or a carbon nano-fiber. The carbon nano-tube or the carbon nano-fiber having a fiber diameter of usually 0.001 to 0.5 μm, preferably 0.003 to 0.2 μm; and a fiber length of usually 1 to 100 μm, preferably 1 to 30 μm is favorable for increasing a conductivity. Conductive fine particles such as metallic carbide and metallic nitride may be used together with the carbon fine particle a.

The ion-permeable compound used in the invention is not particularly limited as long as it has ion-permeable property.

Figure 3:
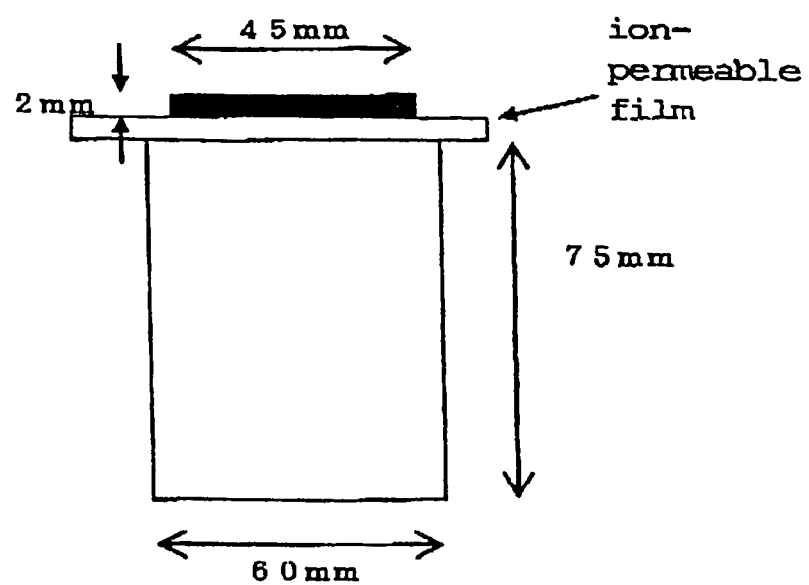
FIG. 3 illustration of glass cell for measurement of fluoride ion permeability.

The ion-permeable compound having a large ion-permeability is preferable. Specifically the ion-permeable compound having a fluoride ion permeability of $1 \times 10^{-2}$ S/cm or more is favorable. A fluoride ion permeability can be determined as the following. Ion-permeable compound is dissolved in water or n-methylpyrrolidone to adjust viscosity, is applied on a substrate and is dried for 5 minutes at 150° C. in an atmosphere of air to obtain a thin film (ion-permeable film). The thin film is peeled off the substrate for measuring a thickness d [μm]. As shown in FIG. 3, 212 $cm^3$ of pure water having temperature of 25° C. and an electric conductivity $\sigma_0$[S/cm] are filled into a glass cell having a caliber of 6 cm and a depth of 7.5 cm, and the glass cell is sealed with the above thin film. On to the above thin film, 3.18 $cm^3$ (diameter: 4.5 cm, height: 2 mm) of a solution of hydrogen fluoride having temperature of 25° C. and concentration of 0.005% by mass are contacted at 15.9 cm$^2$ in a contact area for 60 seconds. The thin film is taken off the glass cell, and an electric conductivity $\sigma_0$ [S/cm] of the pure water in the cell is measured. An ion-permeability T [S/cm] is calculated by the following formula with the electric conductivity $\sigma_0$ of the pure water at sealing and the electric conductivity $\sigma_0$ of the pure water after contacting with the solution of hydrogen fluoride.

$$T=(\sigma_1-\sigma_0)\times d/0.1$$

Also, the ion-permeable compound is preferably 50,000 or less in a number average molecular weight.

The ion-permeable compound used in the invention is preferably a compound not being swellable with an organic solvent. Also the ion-permeable compound is preferably a compound which does not come off in a friction peeling test with an organic solvent. It is preferable that the film does not swell or dissolve in the electrolytic solution, since an organic solvent may be used for an electrolytic solution of an electric double layer capacitor.

Swellability with an organic solvent is estimated by whether film of an ion-permeable compound swells or not after the film is immersed in the organic solvent (30° C.) used for an electrolytic solution for 60 minutes.

In a friction peeling test with organic solvent, the surface of the film of an ion-permeable compound is rubbed with a cloth penetrated with organic solvent 10 times at 100 g in load, and then the film is observed whether the film peels or not.

Polysaccharides or cross-linked polysaccharides are mentioned, as the favorable ion-permeable compound.

Polysaccharides is a high molecular compound which many monosaccharides (including monosaccharide substitution products or monosaccharide derivatives) are polymerized with glycoside bond. Polysaccharides resolves into many monosaccharides by hydrolysis. Polysaccharides is usually described as polymer of 10 or more of monosaccharides. The polysaccharides may have substituent, and include polysaccharides (amino sugars) which amino group is substituted for alcoholic hydroxyl group, substitution products with carboxyl group or alkyl group, de-acetylation products of polysaccharides and the like. Polysaccharides may be any of homopolysaccharides and heteropolysaccharides.

Mentioned as polysaccharides are agarose, amylose, amylopectin, araban, arabinan, arabino-galactan, alginic acid, inulin, carrageenan, galactans, galactosamine (chondrosamine), glucan, xylan, xyloglucan, carboxyalkylchitin, chitin, glycogen, glucomannan, keratan sulfate, colominic acid, chondroitin sulfate A, chondroitin sulfate B, chondroitin sulfate C, cellulose, dextran, starch, hyaluronic acid, fructan, pectinic acid, pectinic substance, heparanic acid, heparin, hemicellulose, pentosan, $\beta$-1,4'-mannan, $\alpha$-1,6'-mannan, lichenin, levan, lentinan, chitosan and the like. In these, chitin, chitosan are preferable.

As Crosslinker used for cross-linking poly-saccharides, any of acrylamide, acrylonitrile, chitosan-pyrrolidone-carboxylate, hydroxy-propyl-chitosan, phthalic anhydride, maleic anhydride, trimellitic anhydride, pyromellitic anhydride, and acid anhydride are favorable.

More specifically, as ion-permeable compound are mentioned cross-linked polymer of cellulose by acrylamide, cross-linked polymer of cellulose by chitosan-pyrrolidone-carboxylate, chitosan or chitin cross-linked by the crosslinkers, polysaccharides cross-linked by acryl based additives or acid anhydride and the like. The ion-permeable compound may be used alone or in combination with at least two.

In the film a, ratio by mass of the ion-permeable compound and the carbon fine particle a (=ion-permeable compound/carbon fine particle a) is preferably 20/80 to 99/1, more preferably 40/60 to 90/10.

The film a may comprise an activated carbon a if necessary. The activated carbon a comprised in the film a enlarges an electric capacity of an electric double layer capacitor. The activated carbon a may be selected from the mentioned as the following activated carbon b.

The film a is not particularly limited by the method of forming. For example, the ion-permeable compound, the carbon fine particle a, and optionally the activated carbon a are dispersed or dissolved in solvent to prepare composition, the composition can be applied on to a conductive sheet, and dried to form a film a.

Casting process, bar coating process, dipping process, printing process and the like are mentioned as the manner for applying. In these manners, bar coating process, casting process are favorable in view of easily controlling a thickness of film.

Solvent used in the composition is not particularly limited as long as it can disperse or dissolve the ion-permeable compound and the carbon fine particle a. Solvent is preferably added so as to be 10% by mass to 100% by mass in solid content of the composition in order to adjust a viscosity of the composition. Almost 100% of solvent are removed by drying after the application.

After drying, the film a is preferably heat-cured. The ion-permeable compound comprising polysaccharides or crosslinked polysaccharides contains curable material by heating. The above cross-linker may be further added into the composition in order to harden the film a.

Thickness of the film a is preferably not less than 0.01 μm and not more than 50 μm, more preferably not less than 0.1 μm and not more than 10 μm. The thickness is so thin that it is not apt to obtain the desired effect such as a decline of internal resistance. The thickness is so thick that the film a largely wastes the volume in the electric double layer capacitor, and an electric capacity per volume of the capacitor is apt to be lowered.

It is preferable that the film a adheres to the conductive sheet not to peel off, specifically the film a does not come off in a tape peeling test (JIS D0202-1988).

[Electrode for Electric Double Layer Capacitor]

An electrode for an electric double layer capacitor of a preferable mode in the invention comprises the above collector for an electric double layer capacitor, and a film b comprising a binder, a carbon fine particle b, and an activated carbon b, in which the film b is on the film a in the collector.

The film b comprised in the electrode for an electric double layer capacitor of a preferable mode in the invention comprises a binder, a carbon fine particle b, and an activated carbon b.

The binder is known binder used in an electrode for an electric double layer capacitor. Mentioned as the binder are poly-vinyliden fluoride, poly-tetra-fluoro-ethylene, styrene-butadiene rubber and the like. The liquid binder is favorable for mixing with the following activated carbon b and so on, in which the liquid binder is dispersion or solution of binder in a solvent such as N-methylpyrrolidone, xylene, and water. The film b may contains the above ion-permeable compound.

The activated carbon b is preferably large in a specific surface area in view of enlarging an electric capacity. Specifically, the activated carbon b has a BET specific surface area of preferably 800 to 2500 m$^2$/g. The activated carbon b is preferably 1 μm to 50 μm in an average particle size (D50). An average particle size (D50) of an activated carbon is a cumulative particle size at 50% measured by a microtrac particle size distribution measure.

The activated carbon b may employ the known activated carbon. For instance, coconut shell activated carbon, fibrous activated carbon and the like are mentioned. The activated carbon is not particularly limited by the method of activation, and the activated carbon obtained by a steam activation process, a chemical activation process and so on may be employed. Activated carbon obtained by alkali activation process (alkali activated carbon) is favorable for obtaining a capacitor having high capacity. The alkali activated carbon may be obtained by heating coconut shell, coke, char of polymer, hard-graphitizable coke, or easy-graphitizable coke in the presence of alkali metallic compound. As easy-graphitizable coke, for instance, coke obtained by heating pitch such as petroleum based pitch, coal based pitch, or organic solvent dissoluble constituent thereof; coke of polyvinyl-chloride compound are employed. Mentioned as alkali metallic compound are sodium hydroxide, potassium hydroxide, potassium carbonate and the like.

The activated carbon b used in the invention is preferably 0.3 g/cm$^3$ to 0.9 g/cm$^3$ in a harden bulk density (tapping density). A harden bulk density is so little that packing density is decreased and electric capacity per volume or per cell of an electric double layer capacitor is apt to be lowered. A harden bulk density is so large that electric capacity per weight is decreased, and the holding volume of electrolytic solution is likely to be decreased, which results in being to fall a retention rate of capacity.

Ratio by mass of the binder and the activated carbon b (=binder/activated carbon b) in the film b is preferably 50/50 to 1/99, more preferably 30/70 to 3/97.

The carbon fine particle b is the same as the exampled as the above carbon fine particle a. Specifically, acetylene black, ketjen black, vapor grown carbon fiber, graphite (black lead) and so on may be employed as the carbon fine particle b. In the film b are preferably contained 2 to 10% by mass of the carbon fine particle b.

Thickness of the film b can be adjusted in accordance with the desired electric capacity, is preferably not less than 10 μm and not more than 500 μm.

The film b is not particularly limited by the method of forming. For example, the binder, the carbon fine particle b, and the activated carbon b are dispersed or dissolved in solvent to prepare composition, the composition can be applied on the film a, and dried to form a film b.

Casting process, bar coating process, dipping process, printing process and the like are mentioned as the manner for applying. In these manners, bar coating process, casting process are favorable in view of easily controlling a thickness of film.

Solvent used in the composition is not particularly limited as long as it can disperse or dissolve the binder, the carbon fine particle b and the activated carbon b. Proper amount of solvent is preferably added in order to adjust a viscosity of composition. Almost 100% of solvent are removed by drying after the application.

An electric double layer capacitor of a preferable mode in the invention comprises the above electrode for an electric double layer capacitor, separator which is piled on the electrode, and an electrolytic solution which the electrode and the separator are immersed in.

Any of non-aqueous electrolytic solution and aqueous electrolytic solution known in the prior art may be employed as the electrolytic solution in the electric double layer capacitor. Also high-molecular solid electrolyte being non-aqueous electrolyte, polymer gel electrolyte, and ionic liquid may be further employed as the other electrolyte.

As the aqueous electrolytic solution are mentioned sulfuric acid aqueous solution, sodium sulfate aqueous solution, sodium hydroxide aqueous solution and the like.

As non-aqueous electrolytic solution is mentioned an electrolytic solution comprising: quarternary ammonium salts or quarternary phosphonium salts used as electrolyte comprising cation represented by $R^1R^2R^3R^4N^+$ or $R^1R^2R^3R^4P^+$ ($R^1$, $R^2$, $R^3$, and $R^4$ are respectively alkyl group having 1 to 10 of carbon atom, or allyl group), and anion such as $BF_4^-$, $PF_6^-$, and $ClO_4^-$; and non-aqueous carbonate solvent such as ethylene carbonate, and propylene carbonate used as solvent. The electrolyte and the solvent may be respectively used alone or in combination with two or more.

The separator piled on the electrode may be ionic permeable porous separator. For example, microporous polyethylene film, micro-porous polypropylene film, polyethylene non-woven fabric, polypropylene non-woven fabric, non-woven fabric mixed with glass fiber, and the like may be preferably used.

The electric double layer capacitor in the invention may be any of coin type capacitor which a pair of electrode sheets in the state that a separator is interposed between the electrode sheets is put in a metallic case with electrolytic solution, reel type capacitor which a pair of electrodes in the state that a separator is interposed between the electrodes is rolled up, laminate type capacitor which a lot of electrodes in the state that a separator is respectively interposed between the electrodes are piled, and the like.

The electric double layer capacitor of a preferable mode in the invention can be applied to power supply system. The electric double layer capacitor in the invention can be applied to a power supply system for car such as automobile and railroad; a power supply system for ship; a power supply system for aircraft; a power supply system for mobile electronic equipment such as cellular phone, mobile information terminal, and mobile electronic calculator; a power supply system for office work; a power supply system for a power generation system such as solar battery power generation system, wind power generation system and fuel cell system; a communication apparatus, and an electronic tag and the like.

EXAMPLES

The following examples and comparative examples are shown to explain the invention in the concrete. The invention is not limited by the following examples.

Example 1

An aluminum foil (A1085 in JIS) having a thickness of 30 μm was arranged. An ion-permeable compound obtained by cross-linking a chilosan as polysaccharide with pyromellitic anhydride was arranged. The ion-permeable compound was 35000 in a number average molecular weight as measured by gel permeation chromatography (GPC). The ion-permeable compound was 2.05×10$^{-2}$ S/cm in an ion permeability ($\sigma_0$=4.54×10$^{-6}$ S/cm, at =33.5×10$^{-6}$ S/cm, film thickness d=71 μm).

The ion-permeable compound, carbon fine particle a (acetylene black: average particle size 40 nm), and water in mass ratio of 40:40:20 were mixed and kneaded to obtain a paste.

The paste was applied to the aluminum foil by casting method with an applicator (gap: 10 μm), was dried for 3 minutes in air at 180° C. to form a film a comprising the ion-permeable compound and the carbon fine particle a on the aluminum foil, which allowed to obtain a collector for an electric double layer capacitor.

The film a after, drying was 5 μm in a thickness, and content of carbon fine particle a in the film a was 60% by mass. When an electric conductivity was measured by a normal tester, enough electric conductivity was identified.

FIG. 1 is a schematic illustration of sectional formation of the collector obtained by the above. As shown in FIG. 1, the collector for an electric double layer capacitor in the invention is that the film a (2) is laminated on the aluminum foil (1). Carbon fine particle (3) and ion-permeable compound (4) are included in, the film a (2).

Example 2

A paste comprising an activated carbon, carbon fine particle b, binder and solvent in accordance with the following recipe was applied to the collector obtained by EXAMPLE 1 to form a polarizable electrode layer (film b) comprising the activated carbon as a main ingredient having a thickness of 200 μm, which allowed to make an electrode for an electric double layer capacitor.

Activated carbon: alkali activated carbon having a specific surface area of 1500 $m^2$/g
  85 parts by mass
Carbon fine particle b: Acetylene Black (average particle size 40 nm)
  5 parts by mass
Binder: polyvinylidene fluoride (PVDF)
  10 parts by mass
Solvent: N-methyl-2-pyrrolidone (NMP)
  8.5 parts by mass
  (10% by mass to the activated carbon)

The electrode for an electric double layer capacitor was stamped into two discoidal electrodes having a diameter of 20 mm which were fitted into a capacitor vessel for evaluation. The two electrodes were piled in the state that a separator was interposed between the electrodes, and were put in the capacitor vessel for evaluation. An organic electrolytic solution was poured in the vessel to immerse the electrode et al. Finally, the vessel was covered to make an electric double layer capacitor for evaluation.

As the organic electrolytic solution, "LIPASTE-P/EAFIN" (1 mol/l) as trade name produced by TOMIYAMA PURE CHEMICAL INDUSTRIES LTD. comprising propylene carbonate as solvent and $(C_2H_5)_4NBF_4$ as electrolyte was used.

Figure 2:
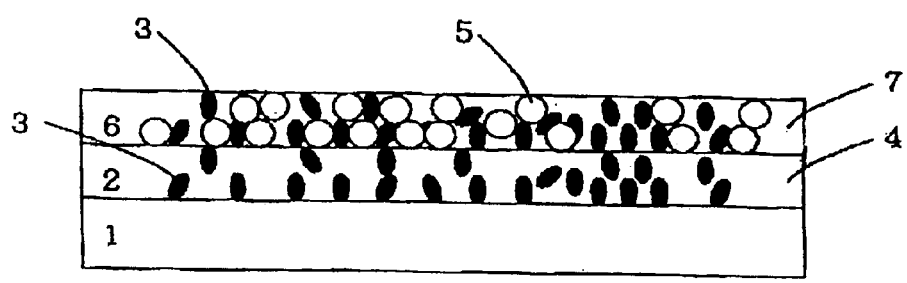
FIG. 2 schematic illustration of sectional formation of the electrode for an electric double layer capacitor obtained in Example 2.

FIG. 2 is a schematic illustration of sectional formation of the electrode obtained by the above. As shown in FIG. 2, the electrode for an electric double layer capacitor in the invention is that the film a (2) is laminated on the aluminum foil (1), and the film b (6) is further laminated on the film a. Binder (7), activated carbon (5), and carbon fine particle b (3) are included in the film b (6).

An impedance and an electric capacity of the electric double layer capacitor obtained by the above were determined. The results are shown in Table 1.

Impedance was measured at 1 kHz with an impedance measure (PAN110-5AM) produced by KIKUSUI ELECTRONICS CORPORATION. Electric capacity was measured by charge and discharge operations between 0 V and 2.5 V at 1.59 mA/$cm^2$ in a current density with a charge-discharge unit (HJ-101SM6) produced by HOKUTO DENKO CORPORATION. An electric capacity per cell (F/cell) of the electric double layer capacitor was calculated from discharge property curve in the 2nd constant current discharge operation.

A retention rate of the electric capacity was determined from the formula: (an electric capacity of the 20th cycle operation)/(an electric capacity of the 2nd cycle operation)×100.

As shown in Table 1, an electric double layer capacitor obtained by using the collector in the invention has low impedance, high electric capacity per cell, and good retention rate.

Example 3

A collector for an electric double layer capacitor was obtained by the same manner as EXAMPLE 1 except that the carbon fine particle a (acetylene black) used in EXAMPLE 1 was replaced with a vapor grown carbon fiber (VGCF (Registered Trade Mark) produced by SHOWA DENKO K.K., fiber length 20 μm). An electrode for an electric double layer capacitor, and an electric double layer capacitor were obtained by the same manner as EXAMPLE 2 except that the collector was used. The results are shown in Table 1.

Example 4

An electrode for an electric double layer capacitor, and an electric double layer capacitor were obtained by the same manner as EXAMPLE 2 except that the carbon fine particle b (acetylene black) used in EXAMPLE 2 was replaced with a vapor grown carbon fiber (VGCF (Registered Trade Mark) produced by SHOWA, DENKO K.K., fiber length 20 μm). The results are shown in Table 1.

Example 5

An ion-permeable compound obtained by cross-linking a chitin as polysaccharide with maleic anhydride was arranged. The ion-permeable compound was 30000 in a number average molecular weight as measured by GPC. A paste was made by the same manner as EXAMPLE 1 except that the above ion-permeable compound was used, which allowed to obtain a collector comprising a film comprising the ion-permeable compound and carbon fine particle, and aluminum foil.

An electric double layer capacitor was obtained by the same manner as EXAMPLE 2 except that the collector was used. An electric capacity, retention rate, internal resistance, and -impedance were similarly determined. The results are shown in Table 1.

Example 6

A paste was obtained by the same manner as EXAMPLE 1 except that an aluminum foil (A1085) used in EXAMPLE 1 was replaced with an aluminum foil (A3003), and ion-permeable compound was replaced with a compound (31000 in a number average molecular weight as measured by GPC) obtained by cross-linking chitosan as polysaccharide with acrylonitrile, which allowed to obtain a collector comprising a film comprising an ion-permeable compound and a carbon fine particle, and an aluminum foil.

An electric double layer capacitor was obtained by the same manner as EXAMPLE 2 except that the collector was used. Electric capacity, retention rate, internal resistance, and impedance were similarly determined. The results are shown in Table 1.

Example 7

A paste was obtained by the same manner as EXAMPLE 1 except that ion-permeable compound used in EXAMPLE 1 was replaced with a compound (22000 in a number average molecular weight as measured by GPC) obtained by cross-linking chitosan as polysaccharide with trimellitic anhydride, which allowed to obtain a collector comprising a film comprising an ion-permeable compound and a carbon fine particle, and an aluminum foil.

An electric double layer capacitor was obtained by the same manner as EXAMPLE 2 except that the collector was used. Electric capacity, retention rate, internal resistance, and impedance were similarly determined. The results are shown in Table 2.

Example 8

An ion-permeable compound obtained by cross-linking a chitosan as polysaccharide with acrylonitrile was arranged. A film having a thickness of 0.5 μm of the ion-permeable compound was evaluated by tape peeling test. Any of 100 squares did not come off. The ion-permeable compound was 26000 in a number average molecular weight as measured by GPC.

A paste was made by the same manner as EXAMPLE 1 except that the above compound obtained by cross-linking chitosan with acrylonitrile, and a compound obtained by cross-linking chitosan with trimellitic anhydride (22000 in number average molecular weight as measured by GPC) were used together, which allowed to obtain a collector comprising a film comprising the ion-permeable compound and a carbon fine particle, and an aluminum foil.

An electric double layer capacitor was obtained by the similar manner to EXAMPLE 2. An electric capacity, retention rate, internal resistance, and impedance were similarly determined. The results are shown in Table 2.

Comparative Example 1

A collector for an electric double layer capacitor was obtained by the same manner as EXAMPLE 1 except that the carbon fine particle a was, not used, that is, a solution only comprising an ion-permeable compound and water was used instead of the paste used in EXAMPLE 1. The results are shown in Table 2. When an electric conductivity was measured by a normal tester, electricity did not move.

Comparative Example 2

An electrode for an electric double layer capacitor, and an electric double layer capacitor were obtained by the same manner as EXAMPLE 2 except that aluminum foil made from A1085 in which the surface of the foil was etched was used instead of the collector used in EXAMPLE 2. The results are shown in Table 2.

Comparative Example 3

An electric double layer capacitor was made by the same manner as EXAMPLE 1 and EXAMPLE 2 except that the ion-permeable compound was replaced with PVDF. Ion permeability of PVDF was $0.81\times10^{-2}$ S/cm ($\sigma_0=4.54\times10^{-6}$ S/cm, $\sigma_1=6.42\times10^{-6}$ S/cm, film thickness d–433 μm). Retention rate and internal resistance were determined by the same condition as EXAMPLE 2. The results are shown in Table 2. The surface of the collector widely peeled when the surface was rubbed with a cloth penetrated with propylene carbonate, though the electric double layer capacitor was able to be produced. Even though the electric double layer capacitor obtained in COMPARATIVE EXAMPLE 3 is good in initial property, it is supposed that the capacitor can not stand long-time run.

Comparative Example 4

An electric double layer capacitor was made by the same manner as EXAMPLE 1 and EXAMPLE 2 except that the ion-permeable compound was replaced with PVA (Polyvinyl alcohol) binder. Retention rate and internal resistance were determined by the same condition as EXAMPLE 2. The results are shown in Table 2. The surface of the collector widely peeled by a tape peeling test being the same as COMPARATIVE EXAMPLE 3, though the electric double layer capacitor was able to be produced. Even though the electric double layer capacitor obtained in COMPARATIVE EXAMPLE 4 is good in initial property, it is supposed that the capacitor can not stand longtime run.

TABLE 1

| | Film a | | Film b | | | | |
|---|---|---|---|---|---|---|---|
| | carbon fine particle a | ion-permeable compound | carbon fine particle b | Tester conductible test | impedance (Ω) | electric capacity (F/cell) | retention rate (%) |
| Ex. 1 | Acetylene Black | chitosan-pyromellitic anhydride | — | conductible | — | — | — |
| Ex. 2 | Acetylene Black | chitosan-pyromellitic anhydride | Acetylene Black | conductible | 1.51 | 1.69 | 98 |
| Ex. 3 | VGCF | chitosan-pyromellitic anhydride | Acetylene Black | conductible | 1.54 | 1.20 | 98 |
| Ex. 4 | Acetylene Black | chitosan-pyromellitic anhydride | VGCF | conductible | 1.39 | 1.79 | 99 |
| Ex. 5 | Acetylene Black | chitin-maleic anhydride | Acetylene Black | conductible | 1.39 | 1.72 | 98 |
| Ex. 6 | Acetylene Black | chitosan-acrylonitrile | Acetylene Black | conductible | 1.51 | 1.69 | 98 |

TABLE 2

|  | Film a | | Film b | | | | |
| --- | --- | --- | --- | --- | --- | --- | --- |
|  | carbon fine particle a | ion-permeable compound | carbon fine particle b | Tester conductible test | impedance (Ω) | electric capacity (F/cell) | retention rate (%) |
| Ex. 7 | Acetylene Black | chitosan-trimellitic anhydride | Acetylene Black | conductible | 1.52 | 1.68 | 98 |
| Ex. 8 | Acetylene Black | chitosan-trimellitic anhydride + chitosan-acrylonitrile | Acetylene Black | conductible | 1.53 | 1.72 | 98 |
| Comp. Ex. 1 | — | chitosan-pyromellitic anhydride | — | isolation | — | — | — |
| Comp. Ex. 2 | — | — | Acetylene Black | conductible | 4.32 | 1.22 | 97 |
| Comp. Ex. 3 | Acetylene Black | PVDF | Acetylene Black | conductible | 17.0 | 1.65 | 80 |
| Comp. Ex. 4 | Acetylene Black | PVA | Acetylene Black | conductible | 15.2 | 1.62 | 70 |

According to Table 1 and Table 2, it is known that any electric double layer capacitors (EXAMPLEs) using the collector for an electric double layer capacitor in the invention have lower impedance, higher electric capacity, and more excellent retention rate than COMPARATIVE EXAMPLEs. The capacitor in the invention can be charged and discharged by large electric current (that is quick chargeable/dischargeable), and it is considered that the capacitor in the invention has greater performance than the conventional electric double layer capacitor.

Though intimate ground that the electric double layer capacitor in the invention has low impedance and high electric capacity isn't known, it is guessed that ion-permeable compound and conductive carbon fine particle a in the film a help movement of ion and electron respectively, which results in making ion and electron smoothly move between a polarizable electrode layer (film b) and a conductive sheet (aluminum foil).

What is claimed is:

1. A collector for an electric double layer capacitor, comprising:
    a conductive sheet; and
    a film adhered on a surface of the conductive sheet and comprising a carbon fine particle and at least one of a polysaccharide and a cross-linked polysaccharide.

2. An electrode for an electric double layer capacitor, comprising:
    a collector according to claim 1; and
    a film comprising an activated carbon and adhered on a surface of the film of the collector.

3. A method for producing an electrode for an electric double layer, comprising:
    coating onto a surface of a film of a collector according to claim 1 a composition comprising an activated carbon and a solvent; and
    drying the composition coated on the surface of the film of the collector such that a film comprising the activated carbon is adhered on the surface of the film of the collector.

4. An electric double layer capacitor, comprising:
    an electrode according to claim 2;
    a separator; and
    an electrolyte.

5. The electric double layer capacitor according to claim 4, whose impedance as measured at 1 kHz is 1.54Ω or below.

6. The electric double layer capacitor according to claim 4, whose retention rate of an electric capacity is 98% or more, wherein the retention rate of the electric capacity is determined from formula, (an electric capacity of the 20th cycle operation)/(an electric capacity of the 2nd cycle operation)× 100, and the electric capacity is measured by charge and discharge operation between 0 V and 2.5 V at 1.59 mA/cm$^2$ in a current density.

7. A method for producing an electric double layer capacitor, comprising:
    piling an electrode according to claim 2 and a separator such that a pile comprising the electrode and the separator is formed; and
    immersing the pile comprising the electrode and the separator in an electrolytic solution.

8. A power supply system comprising:
    an electric double layer capacitor according to claim 4.

9. A collector according to claim 1, wherein the film comprises the polysaccharide and the cross-linked polysaccharide.

10. An electrode for an electric double layer capacitor, comprising:
    a collector according to claim 9; and
    a film comprising an activated carbon and adhered on a surface of the film of the collector.

11. An electric double layer capacitor, comprising:
    an electrode according to claim 10;
    a separator; and
    an electrolyte.

12. An electric double layer capacitor according to claim 11, wherein the separator comprises an ionic permeable porous separator.

13. An electric double layer capacitor according to claim 11, wherein the separator comprises at least one of a microporous polyethylene film, a micro-porous polypropylene film, a polyethylene non-woven fabric, a polypropylene non-woven fabric, and a non-woven fabric mixed with glass fiber.

14. An electric double layer capacitor according to claim 13, wherein the electrolyte comprises at least one of a high-molecular solid electrolyte, a polymer gel electrolyte, and an ionic liquid.

15. An electric double layer capacitor according to claim 4, wherein the separator comprises an ionic permeable porous separator.

16. An electric double layer capacitor according to claim 4, wherein the separator comprises at least one of a microporous polyethylene film, a micro-porous polypropylene film, a polyethylene non-woven fabric, a polypropylene non-woven fabric, and a non-woven fabric mixed with glass fiber.

17. An electric double layer capacitor according to claim 4, wherein the electrolyte comprises at least one of a high-molecular solid electrolyte, a polymer gel electrolyte, and an ionic liquid.

18. A method for producing a collector for an electric double layer capacitor, comprising:
   coating onto a surface of a conductive sheet a composition comprising a carbon fine particle, a solvent and at least one of a polysaccharide and a cross-linked polysaccharide; and
   drying the composition coated on the surface of the conductive sheet such that a film comprising the carbon fine particle and at least one of the polysaccharide and the cross-linked polysaccharide is adhered on the surface of the conductive sheet.

19. A method for producing an electrode for an electric double layer, comprising:
   coating onto a surface of a conductive sheet a composition comprising a carbon fine particle, a solvent and at least one of a polysaccharide and a cross-linked polysaccharide;
   drying the composition coated on the surface of the conductive sheet such that a film comprising the carbon fine particle and at least one of the polysaccharide and the cross-linked polysaccharide is adhered on the surface of the conductive sheet;
   coating onto a surface of the film a composition comprising an activated carbon and a solvent; and
   drying the composition coated on the surface of the film such that a film comprising the activated carbon is adhered on the surface of the film.

20. A coating composition for forming a film in a collector for an electric double layer capacitor, the coating composition comprising:
   a solvent;
   a carbon fine particle; and
   at least one of a polysaccharide and a cross-linked polysaccharide,
   wherein the coating composition is capable of forming a film comprising the carbon fine particle and at least one of the polysaccharide and the cross-linked polysaccharide adhered on a surface of a conductive sheet of a collector.

* * * * *